(12) United States Patent
Eguchi et al.

(10) Patent No.: US 10,048,407 B2
(45) Date of Patent: Aug. 14, 2018

(54) ANTIGLARE FILM, POLARIZER, AND IMAGE DISPLAY DEVICE

(75) Inventors: Junya Eguchi, Tokyo (JP); Tasuku Kitamura, Tokyo (JP); Shoichiro Ogumi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 377 days.

(21) Appl. No.: 13/879,535

(22) PCT Filed: Oct. 21, 2011

(86) PCT No.: PCT/JP2011/074280
§ 371 (c)(1),
(2), (4) Date: Jun. 13, 2013

(87) PCT Pub. No.: WO2012/053632
PCT Pub. Date: Apr. 26, 2012

(65) Prior Publication Data
US 2013/0250414 A1    Sep. 26, 2013

(30) Foreign Application Priority Data

Oct. 22, 2010  (JP) ................................ 2010-237832
Sep. 5, 2011   (JP) ................................ 2011-193278

(51) Int. Cl.
*G02B 5/30*     (2006.01)
*G02B 1/111*    (2015.01)
(Continued)

(52) U.S. Cl.
CPC ................ *G02B 1/111* (2013.01); *B32B 5/16* (2013.01); *B32B 23/12* (2013.01); *B32B 27/14* (2013.01);
(Continued)

(58) Field of Classification Search
CPC .... G02B 5/02; G02B 1/10; G02B 5/30; B32B 3/30; B32B 7/02; G02F 1/1335; G09F 9/00
See application file for complete search history.

(56) References Cited

U.S. PATENT DOCUMENTS 7,755,727 B2 *  7/2010  Harada ............. G02F 1/133528
                                                349/117
2005/0255291 A1  11/2005  Iwata et al.
(Continued)

FOREIGN PATENT DOCUMENTS

CN     101120060    2/2008
CN     101398491    4/2009
(Continued)

*Primary Examiner* — Bumsuk Won
*Assistant Examiner* — Balram Parbadia
(74) *Attorney, Agent, or Firm* — Hamre, Schumann, Mueller & Larson, P.C.

(57) ABSTRACT

An antiglare film in which occurrence of screen scintillation and white muddiness can be sufficiently prevented at a high level while maintaining hard coating properties and antiglare properties, and excellent display images with a high contrast can be provided. The antiglare film includes a light-transmitting substrate; and an antiglare layer having a surface roughness on at least one surface of the light-transmitting substrate, wherein the antiglare layer contains an aggregate composed of two or more types of fine particles, and the aggregate forms a projection of the surface of the antiglare layer to form a surface roughness on the antiglare layer.

15 Claims, 5 Drawing Sheets

(51) Int. Cl.
*G02B 5/02* (2006.01)
*G02F 1/1335* (2006.01)
*B32B 5/16* (2006.01)
*B32B 23/12* (2006.01)
*B32B 27/14* (2006.01)
*B32B 27/32* (2006.01)
*B32B 27/36* (2006.01)
*G09F 9/30* (2006.01)

(52) U.S. Cl.
CPC ............ *B32B 27/325* (2013.01); *B32B 27/36* (2013.01); *G02B 5/0242* (2013.01); *G02B 5/30* (2013.01); *G02B 5/3025* (2013.01); *G02F 1/133502* (2013.01); *B32B 2260/025* (2013.01); *B32B 2260/046* (2013.01); *B32B 2307/40* (2013.01); *B32B 2307/50* (2013.01); *B32B 2457/202* (2013.01); *G09F 9/30* (2013.01)

(56) References Cited

U.S. PATENT DOCUMENTS

| | | | |
|---|---|---|---|
| 2006/0110541 A1* | 5/2006 | Russell et al. | 427/372.2 |
| 2006/0147676 A1* | 7/2006 | Yoshida | G02B 5/0226 428/143 |
| 2006/0222999 A1* | 10/2006 | Miyazaki | C08G 59/62 430/280.1 |
| 2007/0121211 A1* | 5/2007 | Watanabe | G02B 1/11 359/601 |
| 2007/0177271 A1* | 8/2007 | Matsunaga | G02B 1/111 359/582 |
| 2008/0030861 A1* | 2/2008 | Ookubo | C08J 7/047 359/601 |
| 2008/0141904 A1 | 6/2008 | Barthel et al. | |
| 2009/0059377 A1* | 3/2009 | Kameshima | G02B 5/0215 359/599 |
| 2009/0202819 A1* | 8/2009 | Asahi | G02B 1/111 428/336 |
| 2010/0015431 A1* | 1/2010 | Matsui | B29C 66/72324 428/323 |
| 2010/0079869 A1* | 4/2010 | Inoue | G02B 5/0221 359/586 |
| 2010/0091374 A1 | 4/2010 | Iwata et al. | |
| 2010/0097705 A1 | 4/2010 | Furui et al. | |
| 2010/0238558 A1* | 9/2010 | Im | C08F 265/04 359/599 |
| 2011/0232761 A1* | 9/2011 | Lomasney | H01L 31/02021 136/262 |
| 2011/0253951 A1* | 10/2011 | Yoshida | C08F 220/22 252/589 |
| 2011/0255169 A1* | 10/2011 | Kang | G02B 5/02 359/601 |
| 2011/0256375 A1* | 10/2011 | Yoshida | C03C 17/007 428/220 |

FOREIGN PATENT DOCUMENTS

| | | | | |
|---|---|---|---|---|
| CN | 101506691 | | 8/2009 | |
| JP | 6-018706 | | 1/1994 | |
| JP | 10-020103 | | 1/1998 | |
| JP | 2001-002799 | | 1/2001 | |
| JP | 2004025650 A | * | 1/2004 | ............... B06D 7/04 |
| JP | 2006-143873 | | 6/2006 | |
| JP | 2006-335893 | | 12/2006 | |
| JP | 2007-322779 | | 12/2007 | |
| JP | 2008-287072 | | 11/2008 | |
| JP | 2008287072 A | * | 11/2008 | ............... G02B 1/10 |
| JP | 2008-304638 | | 12/2008 | |
| JP | 2008304638 A | * | 12/2008 | ............... G02B 5/02 |
| JP | 2009-066757 | | 4/2009 | |
| KR | 10-2004-0038764 | | 5/2004 | |
| KR | 10-2008-0085742 | | 9/2008 | |
| WO | 2006/088202 | | 8/2006 | |

* cited by examiner

Average tilt angle θa   (Kosaka Lab)   Roughness curve

Standard length L $$\theta a = \tan^{-1}\left(\frac{h_1 + h_2 + h_3 + \cdots\cdots + h_n}{L}\right)$$

(a)

(b)

(a)

(b)

(a)

(b)

ANTIGLARE FILM, POLARIZER, AND IMAGE DISPLAY DEVICE

TECHNICAL FIELD

The present invention relates to an antiglare film, a polarizer, and an image display device.

BACKGROUND ART

Image display devices such as cathode ray tube (CRT) display devices, liquid crystal displays (LCD), plasma displays (PDP), electroluminescence displays (ELD), electronic paper displays, tablet computers, and touch panels are generally provided with an optical layered body for antireflection on the outermost surface. Such optical layered bodies for antireflection suppress reflection of images and decrease the reflectivity by scattering or interference of light.

Known as one of optical layered bodies for antireflection is an antiglare film in which an antiglare layer with a surface roughness is formed on a transparent substrate. The surface roughness on the antiglare film scatters natural light, and therefore a decrease in visibility due to reflection of natural light and reflection of images can be prevented.

Such optical layered bodies are usually disposed at the outermost surfaces of image display devices, and therefore need to have hard coating properties in order to prevent the displays from being scratched during handling.

As conventional antiglare films, a film including a light-transmitting substrate and an antiglare layer formed by applying a resin containing a filler such as silicon dioxide (silica) on the surface of the substrate is known (refer to, for example, Patent Literatures 1 and 2).

Examples of the antiglare films include a film in which a surface roughness on an antiglare layer is formed by aggregation of particles such as cohesive silica; a film in which a surface roughness on a layer is formed by adding an organic filler in a resin; and a film in which a surface roughness is transferred on the surface of a layer by laminating a film with projections and depressions.

Such conventional antiglare films all have a light diffusion function and an antiglare function due to the effect of a surface shape of the antiglare layer. In order to improve such antiglare properties, a surface roughness needs to be steep or dense. However, if a surface roughness becomes steep or dense, the haze (haze value) of a coating increases to cause white muddiness, which results in a decrease in contrast of display images.

Further, the conventional antiglare films generate twinkling brightness, so-called screen scintillation, on the surface, which also results in deterioration of visibility of a display screen. Screen scintillation is a phenomenon that fine brightness ununiformity appears on a screen surface when an image display device is turned on and transmitted light from the rear face reaches the screen, and the position of the brightness uniformity seems to be shifting when a viewer changes the viewing angle. The phenomenon is particularly noticeable in the case of full face white display and full face green display.

For example, an antiglare film including a hard coating layer and an antiglare layer laminated to each other is known (refer to, for example, Patent Literature 3). Such a layered anti-reflection film can suppress occurrence of screen scintillation and white muddiness while maintaining hard coating properties and antiglare properties in such a way that fine projections and depressions on the surface of the antiglare layer are smoothed using the same resin as a hard coating layer, thereby smoothing undulation, reducing fine projections and depressions, and making the heights of projections lower than those of conventional ones. However, in such a case, the film thickness increases to 10 µm or more, and thus, such a film fails to sufficiently satisfy the recent requirement for reducing film thickness.

In cases where a surface roughness on a layer is formed using organic fine particles or inorganic fine particles, and an antiglare film is made thin, the fine particles are often aggregated in the height direction, so that the height of the surface roughness increases and screen scintillation or white muddiness is caused. In order to deal with such a defective point, the average particle size of the organic fine particles or inorganic fine particles is made small to lower the height of the surface roughness. In this case, however, the height tends to be rather too much lowered, and the antiglare properties are likely to deteriorate. Therefore, high quality products cannot be stably obtained.

Accordingly, it has been desired to provide an antiglare film including an antiglare single layer with a smooth surface roughness and excellent in contrast in a dark room, capable of sufficiently suppressing screen scintillation and white muddiness in a bright room while maintaining hard coating properties and antiglare properties.

CITATION LIST

Patent Literature

Patent Literature 1: JP H06-18706 A
Patent Literature 2: JP H10-20103 A
Patent Literature 3: WO2006/088202

SUMMARY OF INVENTION

Technical Problem

The present invention has been devised in consideration of the state of the art, and aims to provide an antiglare film, a polarizer, and an image display device, in which hard coating properties and antiglare properties are maintained even though a hard coating layer is a single layer with a small thickness of less than 10 µm; occurrence of screen scintillation can be prevented; and excellent gloss blackness (reproducibility of luster black color as if wetted in screen display) of a black display of an image display device can be provided both in a bright room and a dark room. Gloss blackness in a bright room is visually evaluated based on "white muddiness" and gloss blackness in a dark room is evaluated based on "contrast in a dark room". Therefore, the term "white muddiness" or "contrast in a dark room" is used in the present invention.

Solution to Problem

The present invention relates to an antiglare film comprising: a light-transmitting substrate; and an antiglare layer having a surface roughness on at least one surface of the light-transmitting substrate, wherein the antiglare layer contains an aggregate composed of two or more types of spherical fine particles, and the aggregate forms a projection of the surface of the antiglare layer to form a surface roughness on the antiglare layer.

In the antiglare film of the present invention, the two or more types of spherical fine particles preferably include one or more types of organic fine particles and one or more types of inorganic fine particles.

The organic fine particles preferably have an average particle size of 0.3 to 10.0 μm and the inorganic fine particles preferably have an average particle size of 500 nm to 5.0 μm.

The antiglare layer preferably further contains binder particles. The binder particles are preferably unevenly distributed around the organic fine particles and the inorganic fine particles.

The binder particles are preferably fumed silica. The fumed silica is preferably surface-treated.

The fumed silica is surface-treated by hydrophobing treatment, and the hydrophobizing treatment is preferably methyl treatment, octylsilane treatment, or dimethyl silicone oil treatment.

The organic fine particles are preferably fine particles of at least one material selected from the group consisting of acrylic resins, polystyrene resins, styrene/acrylic copolymer resins, polyethylene resins, epoxy resins, silicone resins, polyvinylidene fluoride resins, and polyfluoroethylene resins. The inorganic fine particles are preferably at least one type of fine particles selected from the group consisting of particles of aluminosilicate, talc, mica, and silica.

Another aspect of the present invention is a polarizer comprises a polarizing element, wherein the polarizer has the antiglare film on the polarizing element surface.

Another aspect of the present invention is an image display device comprising the antiglare film or the polarizer on an outermost surface thereof.

Hereinafter, the present invention will be described in detail.

Intensive investigations on an antiglare film including an antiglare layer with a surface roughness on a light-transmitting substrate by the present inventors show that, in an antiglare film including the antiglare layer that contains an aggregate composed of two or more types of fine particles, the aggregate forms a projection of the surface of the antiglare layer to form a surface roughness on the antiglare layer. The surface roughness is smoother than that of a conventional antiglare layer formed by one or more types of fine particles, which are all equal in size (for example, silica fine particles or acrylic styrene particles). As a result, even though an antiglare layer is a single layer with a small thickness of less than 10 μm, an antiglare film can be obtained which sufficiently prevents occurrence of screen scintillation and white muddiness while maintaining hard coating properties and antiglare properties and has an excellent contrast in a dark room. Thus, the present invention has been completed.

In cases where the aggregate is much smaller than the thickness of an antiglare layer or sinks to the bottom of an antiglare layer, the aggregate may present not only below a projection of a surface roughness but below a depression. In the antiglare film of the present invention, however, observation with an optical microscope (a magnification of 100 to 300 times) in a reflection mode or in a transmission mode shows that most of aggregates form a projection of the surface of the antiglare layer.

The antiglare film of the present invention includes an antiglare layer having a surface roughness on at least one surface of the light-transmitting substrate.

The light-transmitting substrate preferably has smoothness and heat resistance, and is excellent in mechanical strength and optical properties such as a property of not disturbing alignment of light. Specific examples of a material for the light-transmitting substrate include thermoplastic resins such as polyesters (polyethylene terephthalate, polyethylene naphthalate), cellulose triacetate, cellulose diacetate, cellulose acetate butylate, polyamides, polyimides, polyethersulfone, polysulfone, polypropylene, polymethylpentene, polyvinyl chloride, polyvinyl acetal, polyether ketone, polymethyl methacrylate, polycarbonate, and polyurethane. In terms of excellent mechanical strength, polyesters (polyethylene terephthalate, polyethylene naphthalate) are preferred, and in terms of optical properties, cellulose triacetate is preferred.

The thermoplastic resins are preferably used in the form of a film-like body with good flexibility as the light-transmitting substrate. However, in accordance with a usage embodiment in which curability is required, these thermoplastic resins are also usable in the form of a plate or a plate-like body such as a glass plate.

In addition, a film of an amorphous olefin polymer (cyclo-olefin-polymer: COP) having an alicyclic structure may be used as the light-transmitting substrate. Such a film is a substrate made of a norbornene polymer, a monocyclic olefin polymer, a cyclic conjugated diene polymer, a vinyl alicyclic hydrocarbon polymer, or the like. Examples of the film include ZEONEX and ZEONOR (norbornene resin) (product of Nippon Zeon Co., Ltd.), SUMILITE FS-1700 (product of Sumitomo Bakelite Co., Ltd.), ARTON (modified norbornene resin) (product of JSR Corporation), APEL (cyclic olefin copolymer) (product of Mitsui Chemicals, Inc.), Topas (cyclic olefin copolymer) (product of Ticona Inc.), and OPTOREZ OZ-1000 series (alicyclic acrylic resin) (product of Hitachi Chemical Co., Ltd.).

FV series (low birefringence and low photoelastic coefficient films) (product of Asahi Kasei Chemicals Corporation) are also preferred as an alternative substrate of triacetyl cellulose.

The thickness of the light-transmitting substrate is preferably 20 to 300 μm. The lower limit is more preferably 30 μm and the upper limit is more preferably 200 μm. In cases where the light-transmitting substrate is a plate-like body, the thickness thereof may be out of the range of the limit values. Before a layer such as the hard coating layer is formed on the light-transmitting substrate, the substrate may be subjected to physical treatment such as corona discharge treatment and oxidation treatment, or may be subjected to application of an anchor agent or a paint composition called a primer in order to improve adherence properties. In cases where triacetyl cellulose, which is commonly mainly used as a light-transmitting substrate for an LCD, is used as a material, the thickness of the light-transmitting substrate is preferably 20 to 65 μm, which enables thinning of a display.

The antiglare layer is formed on at least one surface of the light-transmitting substrate and has a surface roughness.

In the antiglare film of the present invention, the antiglare layer contains an aggregate formed of two or more types of fine particles or two or more different-size fine particles, and the aggregate forms a projection of the surface of the antiglare layer to form a surface roughness on the antiglare layer.

The surface roughness formed by such an aggregate has an inclination gentler than a surface roughness formed by one or more types of fine particles, which are all equal in size (for example, silica fine particles, which are all equal in size or acrylic styrene particles, which are all equal in size are singly used) or an aggregate of such particles. The reason for this is as follows: first fine particles are placed among second fine particles in the aggregate, and due to the first fine particles placed among the second fine particles, an inclination angle of a surface roughness (projection) mainly formed by the second fine particles on the surface of the antiglare layer is smaller than that of a surface roughness (projection) formed only by the second particles.

In cases where the antiglare layer further contains binder particles described below, some of the aggregates may be composed only of one or more types of fine particles. This is because even if the aggregate is composed of one or more types of fine particles, the fine particles near which the binder particles are distributed are less likely to agglomerate in the height direction. In addition, it is assumed that the binder particles distributed near the fine particles may reduce the steepness of the inclination of the surface roughness (projection) due to the fine particles. Particularly, the binder particles distributed around the aggregate greatly reduce the steepness of the inclination of the projection.

In the antiglare film of the present invention, the two or more types of fine particles are particles that are made of different materials, or if the two or more types of fine particles are made of the same material, they are different in size. Particularly, fine particles all relatively equal in size and fine particles having relatively large variation in size (having a broad particle size distribution) are preferred as fine particles mainly forming a surface roughness (projections) of the antiglare layer. In this case, the materials of the fine particles may be the same or different. The two or more types of fine particles with such a relation of particle size are likely to form an aggregate having a structure in which fine particles with relatively large variation in size are placed among fine particles all relatively equal in size. Therefore, the smooth surface roughness can be suitably formed on the surface of the antiglare layer.

The phrase "fine particles all relatively equal in size" means the case where (d75–d25)/MV is 0.25 or lower, and the phrase "fine particles having a broad particle size distribution" means the case where (d75–d25)/MV exceeds 0.25, wherein MV is an average particle size of fine particles based on weight average; d25 is a 25% cumulative size; and d75 is a 75% cumulative size. The 25% cumulative size means a particle size at which the amount of the particles reaches 25% by mass when the number of the particles is counted on the particle size in the particle size distribution starting from the smallest one, and the 75% cumulative size means a particle size at which the amount of the particles reaches 75% by mass when the number of the particles is counted in the same manner.

The particle size distribution may be determined by image processing of a picture obtained by observation with an optical microscope in a transmission mode.

In the antiglare layer, the two or more types of fine particles forming an aggregate are spherical. Use of such spherical fine particles provides a display image with high contrast and high gloss blackness when the antiglare film of the present invention is used for an image display device.

The term "spherical" means a truly spherical shape, an elliptical shape, or the like, but excludes so-called an amorphous form. If the fine particles have an amorphous form, the total reflection is likely to occur at the interfaces between the fine particles and a binder resin described below that composes the antiglare layer, and black luminance is increased to reduce gloss blackness.

The phrase "forming an aggregate" means that, the distance between one type of fine particle and another type of fine particle of two or more types of particles and the distance between fine particles of the same type of two or more types of fine particles are both within the below-mentioned average particle size of any one type of the two or more types of fine particles.

In the antiglare film of the present invention, the two or more types of fine particles preferably include one or more types of fine particles and one or more types of inorganic fine particles.

Fine particles all relatively equal in size are preferably selected as the organic fine particles. On the other hand, fine particles with relatively large variation in size are preferably selected as the inorganic fine particles. Such organic fine particles and inorganic fine particles tend to provide an aggregate in which the inorganic fine particles are placed among and below the organic fine particles because the specific gravity of the inorganic fine particles are greater than that of the organic fine particles. Thus, the aforementioned antiglare layer having a smooth surface roughness can be prepared. Further, in cases where the organic fine particles are all relatively equal in size and the inorganic fine particles have relatively large variation in size, and further a surface roughness is formed by polymerization shrinkage of the below-described binder resin (radiation-curable resin) in the formation of an antiglare layer, the polymerization shrinkage easily accompanies the change shape of the organic fine particles mainly used for the formation of the surface roughness because the organic fine particles are more flexible than the inorganic fine particles as described below. In such a point of view, a steep surface roughness (projections) is not created.

Formation of such a smooth surface roughness can provide the antiglare film of the present invention in which both antiglare properties and prevention of white muddiness are maintained and screen scintillation is further suppressed.

In order to further suppress screen scintillation, it is preferable to give a little internal scattering effect to the antiglare layer. Giving a slight difference between the refractive index of the organic fine particles and the refractive index of the binder resin is effective as a method for giving a little internal scattering effect to the antiglare layer. The specific value of the slight difference between the refractive index of the organic fine particles and the refractive index of the binder resin is preferably 0.01 to 0.10.

The refractive indexes of the organic fine particles and the binder resin are the refractive indexes of the particles and the binder resin contained in an antiglare layer. Specific examples of a method of measuring the refractive indexes include a method in which an antiglare film is produced, an antiglare layer thereof is cut in the thickness direction to make a cut section, organic fine particles and a binder exposed on the cut section are taken by cutting to obtain pieces thereof, and the refractive indexes of the pieces are directly measured with an abbe refractometer. Further, for example, a method of using a cargill reagent such as the Becke method or a method of quantitatively measuring the refractive indexes by directly measuring an antiglare film by laser interference or measuring spectral reflectance spectrum or spectral ellipsometry may be used.

The organic fine particles mainly form a surface roughness on the antiglare layer, and the refractive index and the particle size thereof are easily controlled. The aggregate containing such organic fine particles allows easy control of the size of a surface roughness formed on the antiglare layer or the refractive index of the antiglare layer. Therefore, the antiglare properties can be controlled and the occurrence of screen scintillation and white muddiness can be suppressed.

The organic fine particles are preferably made of at least one material selected from the group consisting of acrylic resins, polystyrene resins, styrene/acrylic copolymer resins, polyethylene resins, epoxy resins, silicone resins, polyvinylidene fluoride resins, and polyethylene fluoride resins.

Particularly, styrene/acrylic copolymer fine particles are suitably used in view of the controllability of the refractive index.

The organic fine particles are preferably contained in the antiglare layer in an amount of 0.5 to 15.0% by mass. If the amount is less than 0.5% by mass, the antiglare properties may become insufficient. If the amount exceeds 15.0% by mass, too many aggregates may be produced or an aggregate may become too large in size, which may cause problems of white muddiness and/or screen scintillation. The lower limit is more preferably 2.0% by mass, and the upper limit is more preferably 10.0% by mass.

The size of the organic fine particles is properly determined in accordance with the thickness of the antiglare layer or the like. For example, the average particle size is preferably 0.3 to 5.0 μm. If the average particle size is smaller than 0.3 μm, a sufficient surface roughness cannot be formed on the surface of the antiglare layer, and the antiglare film of the present invention may have insufficient antiglare properties. If the average particle size exceeds 5.0 μm, the size of the surface roughness on the surface of the antiglare layer is increased, which may cause a problem of screen scintillation. The lower limit is more preferably 1.0 μm, and the upper limit is more preferably 4.0 μm. The upper limit is still more preferably 3.0 μm because the thickness of the antiglare layer can be reduced.

The average particle size of the organic fine particles is preferably 20 to 80% of the thickness of the antiglare layer. The average particle size of the organic fine particles is determined as an average value of the greatest diameters of 10 organic fine particles, which are measured by observation of the antiglare layer with an optical microscope in a transmission mode at a magnification of 200 to 1000 times. Since the organic fine particles are regarded as spherical, the size of the organic fine particles can be simply measured using image-processing software.

The thickness of the antiglare layer is preferably 2 to 6 μm. If the thickness is smaller than 2 μm, the surface of the antiglare layer tends to be damaged. If the thickness exceeds 6 μm, the antiglare layer tends to be cracked. The thickness of the antiglare layer is more preferably in the range of 2 to 4 μm. The thickness of the antiglare layer is determined by calculating the average of the thicknesses of the layer where no organic fine particles are observed in the vertical direction of the light-transmitting substrate, at any three points. The thicknesses are measured by observation of the cross-section of the antiglare layer with STEM at a magnification of 1000 to 3000 times in an observation screen or an observation picture. In the STEM observation of the cross-section of the antiglare layer, a point where organic fine particles with the largest size are observed is a projection of the surface of the antiglare layer, and the point may have the largest thickness in the antiglare layer. Therefore, points where no organic fine particles are observed are selected.

The organic fine particles are preferably subjected to hydrophilic treatment on their surface in order to improve the affinity with the inorganic fine particles and form a more preferable aggregate.

Examples of the hydrophilic treatment include, but are not particularly limited to, known methods such as a method of copolymerization of a monomer containing a functional group, e.g., a carboxylic acid group and a hydroxyl group, on the surface of the organic fine particles.

In the antiglare layer, the inorganic fine particles in the aggregate are located between the organic fine particles adjacent to each other, or above or below the organic fine particles. The inorganic fine particles located between the organic fine particles adjacent to each other provide an appropriate distance between the organic fine particles adjacent to each other. Therefore, the inorganic fine particles play a role in the reduction in the inclination of the projection of the surface roughness on the antiglare layer and the formation of an entirely smooth surface roughness.

Such inorganic fine particles are preferably one or more types of fine particles selected from the group consisting of particles of aluminosilicate, talc, mica, and silica. Particularly, the particles are preferably spherical fine particles because the variation in shape of the particles is constant, reflection at interfaces between the particles and a binder resin is suppressed, stray light is less generated, and the contrast in a dark room and the contrast in a bright room can be increased. Aluminosilicate is suitably used because spherical particles are easily obtainable.

The inorganic fine particles are contained in the antiglare layer in an amount of 0.1 to 10.0% by mass. If the amount is less than 0.1% by mass, an aggregate composed of organic fine particles and inorganic particles located among and below the organic fine particles is less likely to be formed. Therefore, an antiglare layer with a smooth surface roughness may not be formed. If the amount exceeds 10.0% by mass, a problem of white muddiness may be caused.

The lower limit is more preferably 0.5% by mass, and the upper limit is more preferably 7.0% by mass.

The inorganic fine particles preferably have an average particle size of 500 nm to 5.0 μm. If the average particle size is smaller than 500 nm, the inorganic fine particles may insufficiently form an aggregate with the organic fine particles in the antiglare layer. If the average particle size exceeds 5.0 μm, a problem of white muddiness may be caused. Further, in order to allow the inorganic fine particles to be located below the organic fine particles in the aggregate, the inorganic fine particles preferably have a specific gravity twice or more as great as that of the organic fine particles.

The average particle size of the inorganic fine particles is determined as an average of the greatest diameters of 10 inorganic fine particles, which are measured by observation of the antiglare layer with an optical microscope in a transmission mode at a magnification of 200 to 1000 times.

In the antiglare film of the present invention, the antiglare layer preferably further contains binder particles. The binder particles are preferably unevenly distributed around the organic fine particles and the inorganic fine particles. The binder particles are a component promoting the formation of an aggregate composed of the organic fine particles and inorganic fine particles, and are a component different from the binder resin described below. Since the binder particles are unevenly distributed around the organic fine particles and the inorganic fine particles, the aggregate can be suitably formed.

The phrase "binder particles are unevenly distributed around the organic fine particles and inorganic fine particles" means the state where a small amount of the binder particles are present by itself in the antiglare layer, and many of the binder particles are unevenly distributed around the organic fine particles and inorganic fine particles. Such a state can be easily observed by microscopic observation of the cross-section of the antiglare layer.

The material of the binder particles is preferably one having high affinity with both the organic fine particles and inorganic fine particles and being likely to agglomerate. For example, fumed silica is suitably used. Here, fumed silica means amorphous silica prepared by a dry method and having a particle size of 200 nm or smaller, and is produced by the reaction of a silicon-containing volatile compound in gaseous phase. Specifically, fumed silica is produced, for example, by hydrolyzation of a silicon compound such as $SiCl_4$ in combustion of oxygen and hydrogen. Aaerosil of Nippon Aerosil Co., Ltd. is used, for example, as commercial fumed silica.

The fumed silica has a silanol group on its surface. In the present invention, the fumed silica is preferably surface-treated, and the surface treatment is preferably hydrophobing treatment.

The surface-treated fumed silica can be suitably unevenly distributed on the surfaces of the organic fine particles and inorganic fine particles. The cohesive force of the fumed silica itself allows the formation of an aggregate composed of the organic fine particles and inorganic fine particles. The chemical resistance and saponification resistance of the fumed silica itself can also be improved. If the fumed silica is not surface-treated (is not subjected to hydrophobing treatment), it is excessively present on the surfaces of the organic fine particles and inorganic fine particles, which causes an increase in cohesion force. As a result, a suitable surface roughness is not formed, which may cause white muddiness.

Preferred examples of the hydrophobing treatment include methyl treatment, octyl silane treatment, and dimethyl silicone oil treatment.

The fumed silica is preferably contained in the antiglare layer in an amount of 0.1 to 5.0% by mass. The amount is not particularly limited thereto. If the amount is less than 0.1% by mass, the aggregate may not be sufficiently formed. If the amount exceeds 5.0% by mass, white muddiness may be caused. The lower limit is more preferably 0.5% by mass, and the upper limit is more preferably 3.0% by mass. The fumed silica in an amount in the above range can be suitably unevenly distributed on the surfaces of the organic fine particles and inorganic fine particles, and the cohesive force of the fumed silica itself suitably allows the formation of an aggregate composed of the organic fine particles and inorganic fine particles.

The fumed silica may be in any shape, and preferably has an average primary particle size of 1 to 100 nm. If the average primary particle size is less than 1 nm, the aggregate may not be sufficiently formed. If the average primary particle size exceeds 100 nm, the contrast in a dark room may deteriorate due to the aggregation. The lower limit is more preferably 5 nm, and the upper limit is more preferably 50 nm. The average primary particle size is a value determined based on scanning and transmission electron microscope images using image-processing software.

Here, in the case where the antiglare layer is observed using a microscope such as STEM, the fumed silica with an average primary particle size in the above range agglomerates and forms a structure like beads on a string to be a massive fumed silica. Such a massive fumed silica preferably has an average particle size of 20 to 600 nm because the high transmissivity of the antiglare layer can be maintained. If the particle size exceeds 600 nm, the transparency and the contrast in a dark room may be reduced. A more preferred size is 20 to 400 nm. The average particle size of the massive fumed silica is determined as an average of the greatest particle diameters of 10 massive particles, which are measured by observation of the cross-section of the antiglare layer using STEM.

The specific surface area of the fumed silica determined by a BET method is preferably 100 to 200 $m^2$/g and more preferably 120 to 180 $m^2$/g. Fumed silica with such a specific surface area enables to provide an aggregate with an average particle size within the preferable range.

The fumed silica preferably has a pH of 4.6 to 6.0. When the fumed silica is untreated (hydrophilic), the pH thereof is usually 4.0 to 4.5. Therefore, in order to provide a suitable pH, the fumed silica is preferably subjected to the hydrophobic treatment as described above.

In the antiglare film of the present invention, the antiglare layer preferably contains the aggregates dispersed in the binder resin.

The binder resin preferably has transparency. For example, the resin is preferably an ionizing radiation-curable resin.

The "resin", as used herein, includes a monomer, an oligomer, and the like unless otherwise stated.

Examples of the ionizing radiation-curable resin include compounds having one or more unsaturated bonds, e.g., compounds having an acrylate functional group. Examples of the compound having one unsaturated bond include ethyl(meth)acrylate, ethylhexyl(meth)acrylate, styrene, methylstyrene, and N-vinyl pyrrolidone. Examples of the compound having two or more unsaturated bonds include polyfunctional compounds such as polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate; and reaction products of the polyfunctional compounds with (meth)acrylates (for example, a poly(meth)acrylate ester of a polyhydric alcohol), and the like. The term "(meth)acrylate", as used herein, indicates to methacrylate and acrylate. In the present invention, as the ionizing-radiation curable resin, resins obtained by modifying the compounds with PO, EO, or the like are also usable.

In addition to the above compounds, a resin having an unsaturated double bond and a comparatively low-molecular weight such as a polyester resin, a polyether resin, an acrylic resin, an epoxy resin, a urethane resin, an alkyd resin, a spiroacetal resin, a polybutadiene resin, and a polythiol-polyene resin can be used as the ionizing radiation-curable resin.

The ionizing radiation-curable resin may be used in combination with a solvent-drying resin (a resin that can be a coating only by drying a solvent added to adjust a solids content when coated, such as a thermoplastic resin). The combination use of the solvent-drying resin allows easy control of the viscosity of a coating solution and effectively prevents generation of defects of a surface on which the coating solution is applied.

The solvent-drying resin capable of being used in combination with the ionizing radiation-curable resin is not particularly limited, and a thermoplastic resin may be generally used.

Examples of the thermoplastic resin include, but are not particularly limited to, styrene resins, (meth)acrylic resins, vinyl acetate resins, vinyl ether resins, halogen-containing resins, alicyclic olefin resins, polycarbonate resins, polyester resins, polyamide resins, cellulose derivatives, and silicone resins, and rubbers and elastomers. The thermoplastic resin is preferably non-crystalline and soluble in an organic solvent (particularly, a common solvent in which a plurality of polymers or curable compounds can be dissolved). Particularly from the viewpoint of film forming properties, transparency, and weather resistance, styrene resins, (meth) acrylic resins, alicyclic olefin resins, polyester resins, and cellulose derivatives (cellulose esters, etc.) are preferred.

The antiglare layer may include a thermosetting resin.

Examples of the thermosetting resin include, but are not particularly limited to, phenol resins, urea resins, diallyl phthalate resins, melamine resins, guanamine resins, unsaturated polyester resins, polyurethane resins, epoxy resins, amino alkyd resins, melamine-urea co-condensation resins, silicon resins, and polysiloxane resins.

The antiglare layer containing the aggregate and the binder resin can be formed by, for example, applying a composition for an antiglare layer that contains the two or more types of fine particles, binder particles, a binder resin such as the ionizing radiation-curable resin, a photopolymerization initiator, and the solvent described below to a light-transmitting substrate; drying the composition to form a coating; and curing the coating with ionizing radiation beams or the like.

In the above-described composition for an antiglare layer, the two or more types of fine particles preferably form no aggregate in the composition, but form an aggregate in the dried coating. If the two or more types of fine particles form an aggregate in the composition for an antiglare layer, the antiglare layer having a smooth surface roughness cannot be formed.

Here, if one of the two or more types of fine particles is aluminosilicate, the aluminosilicate is likely to precipitate in the composition for an antiglare layer because of its comparatively high specific gravity. However, the fumed silica as the binder particles can increase the viscosity of the composition for an antiglare layer. Therefore, in the composition for an antiglare layer containing the fumed silica as the binder particles, aluminosilicate can be prevented from precipitating. In other words, it is estimated that the fumed silica has a function of promoting the formation of the aggregate and a function of preventing precipitation of aluminosilicate (that is, a function of improving a pot life of the composition for an antiglare layer).

Examples of a method of forming an aggregate composed of the two or more types of fine particles in the coating include a method of adding a high polarity solvent with a high relative vapor rate in the composition for an antiglare layer in a predetermined amount. In the composition for an antiglare layer containing such a high polarity solvent with a high relative vapor rate, the aggregation of two types of fine particles can be prevented and long-term stable preserving properties of a coating liquid composition can be obtained. On the other hand, such a solvent is volatilized from the coating before other solvents are volatilized so that the formulation of the coating is denatured. As a result, an aggregate composed of the two or more types of fine particles can be formed in the coating. The relative vapor rate is represented as a ratio of a vapor rate of each solvent (here, referred to as a solvent A) based on the vapor ratio of butyl acetate, and is determined by the equation:

Relative vapor rate=(time required for vaporization of $n$-butyl acetate)/(time required for vaporization of solvent $A$)

Examples of the high polarity solvent with a high relative vapor rate include ethanol (relative vapor rate: 1.54) and isopropyl alcohol (relative vapor rate: 1.5). Particularly, isopropyl alcohol is suitably used.

The isopropyl alcohol is preferably contained in the solvent in an amount of 20% by mass or more of the entire solvent. If the amount is less than 20% by mass, the aggregate may be produced in the composition for an antiglare layer. The isopropyl alcohol is preferably contained in an amount of 40% by mass or less.

Examples of other solvents contained in the composition for an antiglare layer include ketones (acetone, methyl ethyl ketone, methyl isobutyl ketone, cyclohexanone etc.), ethers (dioxane tetrahydrofuran etc.), aliphatic hydrocarbons (hexane etc.), alicyclic hydrocarbons (cyclohexane etc.), aromatic hydrocarbons (toluene, xylene etc.), halogenated hydrocarbons (dichloromethane, dichloroethane etc.), esters (methyl acetate, ethyl acetate, butyl acetate etc.), alcohols (butanol, cyclohexanol etc.), cellosolves (methyl cellosolve, ethylcellosolve, etc.), cellosolve acetates, sulfoxides (dimethyl sulfoxide etc.), and amides (dimethylformamide, dimethylacetamide etc.). Mixtures of these solvents may be used.

The photopolymerization initiator to be used is not particularly limited and may be a known one. Examples of the photopolymerization initiator include acetophenones, benzophenones, Michler-benzoyl benzoate, α-amyloxime ester, thioxanthones, propiophenones, benzyls, benzoins, and acyl phosphine oxides. Also, the composition preferably contains a photosensitizer, and specific examples thereof include n-butylamine, triethylamine, and tri-n-butyl phosphine.

In cases where the ionizing-radiation curable resin contains a radically polymerizable unsaturated group, one of acetophenones, benzophenones, thioxanthones, benzoins, and benzoin methyl ether, or any combination of these is preferably used as the photopolymerization initiator. Alternatively, in cases where the ionizing radiation-curable resin contains a cationically polymerizable functional group, one of aromatic diazonium salts, aromatic sulfonium salts, aromatic iodonium salts, metallocene compounds, and benzoin sulfonic esters, or any combination of these is preferably used as the photopolymerization initiator.

The photopolymerization initiator is preferably contained in the composition for an antiglare layer in an amount of 0.5 to 10.0 parts by mass based on 100 parts by mass of the ionizing radiation-curable resin. If the amount is lower than 0.5 parts by mass, the hard coating performance of the antiglare layer to be formed may unfavorably become insufficient, and if the amount exceeds 10.0 parts by mass, curing may be unfavorably inhibited.

The proportion (solids content) of a row material contained in the composition for an antiglare layer is not particularly limited, and is usually preferably 5 to 70% by mass, and particularly preferably 25 to 60% by mass.

To the composition for an antiglare layer may be added any of known dispersant, surfactant, antistatic agent, silane coupling agent, thickener, color protecting agent, coloring agent (pigment, dye), antifoaming agent, leveling agent, fire retardant, ultraviolet ray absorber, tackiness agent, polymerization inhibitor, antioxidant, surface modifier, and lubricant for the purposes such as improving the hardness of the antiglare layer, suppressing cross-linked curing shrinkage, and controlling the refractive index.

Further, the composition for an antiglare layer may contain a photosensitizer, and specific examples thereof include n-butylamine, triethylamine, and tri-n-butyl phosphine.

A method for preparing the composition for an antiglare layer is not particularly limited as long as the respective components are uniformly mixed. For example, it may be prepared using a known device such as a paint shaker, a bead mill, a kneader, or a mixer.

A method for applying the composition for an antiglare layer on the light-transmitting substrate is not particularly limited, and examples thereof include known methods such as a spin coating method, a dip method, a spray method, a die coating method, a bar coat method, a roll coater method, a meniscus coater method, a flexo printing method, a screen printing method, and a bead coater method.

Examples of a method of emitting ionizing radiation in order to cure the coating include a method using a light source such as an ultrahigh pressure mercury lamp, a high-pressure mercury lamp, a low-pressure mercury lamp, a carbon arc lamp, a black light fluorescent lamp, or a metal halide lamp.

An ultraviolet ray having a wavelength in a range of 190 to 380 nm may be used. Specific examples of an electron beam source include electron beam accelerators of various types such as Cockcroft-Walton type, van de Graaff type, resonance transformer type, insulating core transformer type, linear type, dynamitron type, and high frequency type.

In the antiglare film of the present invention, since the surface roughness on the antiglare layer is formed by the aggregate composed of the two or more types of fine particles as described above, the surface roughness can be made smooth. Specifically, with respect to the surface roughness on the antiglare layer, Sm, θa, Ra, and Rz preferably satisfy the following formulae from the viewpoint that reflection of natural light can be prevented, in which Sm is an average distance between projections and depressions on the antiglare layer surface; θa is an average tilt angle of projections and depressions; Ra is an arithmetic mean roughness of projections and depressions; and Rz is 10-point mean roughness of projections and depressions. If θa, Ra, and Rz are below the lower limit, reflection of an image cannot be suppressed. If θa, Ra, and Rz are above the upper limit, a problem such as screen scintillation may be caused. If Sm is below the lower limit, white muddiness may be caused. If Sm is above the upper limit, reflection of an image may not be suppressed.

$$50 \ \mu m < Sm < 600 \ \mu m$$

$$0.1° < \theta a < 1.5°$$

$$0.02 \ \mu m < Ra < 0.25 \ \mu m$$

$$0.30 \ \mu m < Rz < 2.00 \ \mu m$$

The present inventors have found that gloss blackness is affected mainly by projections and depressions with great heights of the surface roughness on the antiglare layer, but gloss blackness in a bright room is affected not only by the projections and depressions with great heights, but also by projections and depressions with small heights. Therefore, in the present invention, the surface roughness on the antiglare layer is controlled by four parameters.

"Sm", as used herein, is an average distance between projections and depressions and "θa" is an average tilt angle of projections and depressions. The surface roughness on the antiglare layer has a low-height projection and a large projection. "Sm" and "θa" are average values of such different heights of the projections. In such average values, a plurality of projections different in height are leveled. However, the projections influence the gloss blackness.

Therefore, in order to represent the limit of the range of values of the differences in heights of projections and depressions with great heights, "Rz" is used as a parameter in the antiglare film of the present invention. "Rz" represents, in accordance with the definition thereof, an average value of five points of projections and depressions with the greatest heights. Therefore, "Rz" can represent the limit of the range of values of the projections and depressions with great heights.

On the other hand, the projections and depressions with small heights are not reflected in "Rz". Therefore, Rz cannot include the projections and depressions with small heights (small projections and depressions). Such a small projections and depressions also influences the gloss blackness in a bright room. For this reason, in order to represent the optimal range of projections and depressions with small heights, "Ra" is used as a parameter in the present invention.

The surface roughness on the antiglare layer more preferably satisfies the following formulae. The surface roughness satisfying the following formulae can prevent reflection of an image and further preferably provide excellent gloss blackness when an image display device is turned black (reproducibility of luster black color as if wetted in screen display). If θa, Ra, Rz, and Sm are above the upper limit or below the lower limit, gloss blackness cannot be provided.

$$100 \ \mu m < Sm < 400 \ \mu m$$

$$0.10° < \theta a < 0.80°$$

$$0.02 \ \mu m < Ra < 0.15 \ \mu m$$

$$0.30 \ \mu m < Rz < 1.20 \ \mu m$$

The surface roughness of the antiglare layer more preferably satisfies the following formulae. The surface roughness satisfying the following formulae prevents reflection of an image and provides excellent gloss blackness when an image display device is turned black.

$$120 \ \mu m < Sm < 300 \ \mu m$$

$$0.10° < \theta a < 0.42°$$

$$0.02 \ \mu m < Ra < 0.12 \ \mu m$$

$$0.30 \ \mu m < Rz < 0.80 \ \mu m$$

As used herein, Sm, Ra, and Rz are values determined according to JIS B 0601-1994, and θa is a value measured by the definition described in the manual (revised 1995. 07. 20) (Kosaka Lab) for a surface roughness measurement device, SE-3400, and can be calculated as arc tangent θa={tan−1 (h1+h2+h3+ . . . +hn)/L} determined by dividing the total height (h1+h2+h3+ . . . +hn) of projections existing in a standard length L by L, as shown in FIG. 1.

These Sm, θa, Ra, and Rz can be determined, for example, with a surface roughness measurement device, SE-3400 of Kosaka Lab., or the like.

The total light transmittance of the antiglare film of the present invention is preferably 85% or more. If the total light transmittance is less than 85%, in cases where the antiglare film of the present invention is mounted on the surface of an image display device, the color reproducibility and visibility may be deteriorated. The total light transmittance is more preferably 90% or more, and still more preferably 91% or more.

The total light transmittance may be measured in accordance with JIS K-7361 with HM-150 of MURAKAMI COLOR RESERCH LABORATORY.

The antiglare film of the present invention preferably has a haze value of less than 20%. The haze may be composed of a haze owing to internal diffusion of the fine particles contained in the antiglare layer and a surface haze owing to a surface roughness on the outermost surface. The haze value owing to internal diffusion is preferably 0.1% or more and less than 20%, more preferably 0.1% or more and less than 10%, and still more preferably 0.1% or more and less than 5%. The surface haze value is preferably 0.1% or more and less than 20%, more preferably 0.1% or more and less than 10%, and still more preferably 0.1% or more and less than 5%. The haze value owing to internal diffusion and the surface haze value are preferably as small as possible for preferable gloss blackness. Therefore, the surface haze value is most preferably 0.1% or more and less than 2%, and the haze value owing to internal diffusion is most preferably 2% or more and less than 5%.

The haze value owing to internal diffusion can be measured as a haze value of a flat surface prepared by applying a transparent resin on the antiglare film to level the surface roughness on the surface. The difference between the refractive index of the transparent resin and the refractive index of the binder resin composing the antiglare layer is less than 0.02.

The haze value may be measured in accordance with JIS K-7361 with HM-150 of MURAKAMI COLOR RESERCH LABORATORY.

Since occurrence of white muddiness can be suitably prevented, the antiglare film of the present invention preferably has a low refractive index layer on the antiglare layer.

The low refractive index layer has a function of reducing the reflectivity of outside light (e.g. fluorescent lamp and natural light) reflected on the surface of an optical layered body. The low refractive index layer may be composed of any of materials: 1) a resin containing silica or magnesium fluoride, 2) a fluororesin which is a low refractive index resin, 3) a fluororesin containing silica or magnesium fluoride, and 4) a thin film of silica or magnesium fluoride. Resins similar to the binder resin composing the antiglare layer can be used as resins other than the fluororesin.

The silica is preferably hollow silica fine particles. Such hollow silica fine particles can be produced by, for example, a production method disclosed in examples of JP 2005-099778 A.

The low refractive index layer preferably has a refractive index of 1.45 or less, and particularly preferably 1.42 or less.

The thickness of the low refractive index layer is not limited, and is usually set within the range of about 30 nm to 1 μm as appropriate.

The low refractive index layer is effective even in a monolayer state, but two or more low refractive index layers may be appropriately formed in order to adjust the smaller minimum reflectance or the greater minimum reflectance. In cases where the two or more low refractive index layers are formed, the low refractive index layers are preferably different in refractive index and thickness.

The fluororesin to be used may be a polymerizable compound containing at least a fluorine atom in the molecule or a polymer thereof. Preferable examples of the polymerizable compound include, but are not particularly limited to, compounds having a curable and reactive group such as a functional group curable with ionizing radiation and a polar group curable with heat. Compounds having these reactive groups in combination are also usable. Unlike the polymerizable compounds, the polymers have no reactive groups listed above at all.

A fluorine-containing monomer having an ethylenically unsaturated bond can be widely used as the polymerizable compound having an ionizing radiation-curable group. Specific examples thereof include fluoroolefins (for example, fluoroethylene, vinylidene fluoride, tetrafluoroethylene, hexafluoropropylene, perfluorobutadiene, perfluoro-2,2-dimethyl-1,3-dioxole). Examples of a polymerizable compound having a (meth)acryloyloxy group include (meth) acrylate compounds containing a fluorine atom in the molecule, such as 2,2,2-trifluoroethyl(meth)acrylate, 2,2,3, 3,3-pentafluoropropyl(meth)acrylate, 2-(perfluorobutyl) ethyl(meth)acrylate, 2-(perfluorohexyl)ethyl(meth)acrylate, 2-(perfluoroctyl)ethyl(meth)acrylate, 2-(perfluorodecyl) ethyl(meth)acrylate, α-trifluoromethyl methacrylate, and α-trifluoroethyl methacrylate; and fluorine-containing polyfunctional (meth)acrylic acid ester compounds containing a C1-C14 fluoroalkyl group, a C1-C14 fluorocycloalkyl group, or a C1-C14 fluoroalkylene group, having at least three fluorine atoms in the molecule, and at least two (meth)acryloyloxy groups.

Preferable examples of the heat-curable polar group include groups forming a hydrogen bond such as a hydroxyl group, a carboxyl group, an amino group, and an epoxy group. They are excellent not only in adhesion to a coating but also in affinity with inorganic ultrafine particles such as silica. Examples of the polymerizable compound having a thermosetting polar group include a 4-fluoroethylene-perfluoroalkyl vinyl ether copolymer; a fluoroethylene-hydrocarbon vinyl ether copolymer; fluorine-modified products of various resins such as epoxy, polyurethane, cellulose, phenol, and polyimide.

Examples of the polymerizable compound having both an ionizing radiation-curable group and a heat-curable polar group include partially or fully fluorinated alkyls, alkenyls, or aryl esters of acrylic acid or methacrylic acid, fully or partially fluorinated vinyl ethers, fully or partially fluorinated vinyl esters, and fully or partially fluorinated vinyl ketones.

Further, examples of the fluororesins include polymers of a monomer or a monomer mixture containing at least one fluorine-containing (meth)acrylate compound of the polymerizable compound containing the ionizing radiation-curable group; copolymers of at least one fluorine-containing (meth) acrylate compound and a (meth)acrylate compound containing no fluorine atom in the molecule such as methyl(meth) acrylate, ethyl(meth)acrylate, propyl(meth)acrylate, butyl (meth)acrylate and 2-ethylhexyl (meth)acrylate; and monopolymers or copolymers of a fluorine-containing monomer such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene. Silicone-containing vinylidene fluoride copolymers that are obtained by adding a silicone component to the above copolymers may also be used. Examples of the silicone component in this case include (poly)dimethylsiloxane, (poly) diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenylmethylsilicone, alkyl-aralkyl-modified silicone, fluorosilicone, polyether-modified silicone, aliphatic acid ester-modified silicone, methyl hydrogen silicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone and fluorine-modified silicone. Among these, a silicone component having a dimethylsiloxane structure is preferred.

Further, non-polymers or polymers composed of the following compounds may also be used as fluororesins. That is, compounds obtained by reacting a fluorine-containing compound containing at least one isocyanato group in the molecule with a compound containing at least one functional group reactive with an isocyanato group such as an amino group, a hydroxyl group, or a carboxyl group in the molecule; and compounds obtained by reacting a fluorine-containing polyol such as a fluorine-containing polyether polyol, fluorine-containing alkyl polyol, fluorine-containing polyester polyol, and fluorine-containing ε-caprolactone-modified polyol with a compound containing an isocyanato group may be used.

The above listed binder resins for the antiglare layer may be used in admixture with the polymerizable compound or polymer containing a fluorine atom. Additionally, a curing agent for a reactive group or the like, and various additives and solvents for improving coatability or providing antifouling properties may be appropriately used.

In the formation of the low refractive index layer, the viscosity of the composition for a low refractive index layer including the low-refractive-index agent, the resin, and the like is set in the range of 0.5 to 5 mPa·s (25° C.), and preferably in the range of 0.7 to 3 mPa·s (25° C.) where desirable application properties are achieved. As a result, an excellent anti-reflection film for visible light can be realized, a uniform thin film can be formed without uneven coating due to application, and a low refractive index layer particularly excellent in adhesion can be formed.

The resin may be cured by a method similar to that for the antiglare layer. When a heating means is used for the curing treatment, for example, a heat-polymerization initiator, which generates radicals by heating to initiate the polymerization of a polymerizable compound, is preferably added to a fluororesin composition.

The thickness (nm) $d_A$ of the low refractive index layer preferably satisfies the equation (1):

$$d_A = m\lambda/(4n_A) \qquad (1)$$

wherein $n_A$ represents a refractive index of the low refractive index layer, m is a positive odd, and preferably 1, and λ is a wavelength, and preferably in the range of 480 to 580 nm.

Further, in the present invention, the low refractive index layer preferably satisfies the formula (2):

$$120 < n_A d_A < 145 \qquad (2)$$

in terms of reducing reflectance.

One or more other layers (an antistatic layer, an antifouling layer, an adhesive layer, and other hard coating layers) may be optionally formed in the antiglare film of the present invention as long as the effects of the present invention are not impaired. Particularly, at least one of an antistatic layer and an antifouling layer is preferably formed. These layers may be the same as those formed for known laminated bodies for antireflection.

The antiglare film of the present invention preferably has a contrast ratio of 80% or more and more preferably 90% or more in a dark room. If the contrast ratio is less than 80%, in cases where the antiglare film of the present invention is mounted on the surface of a display, the visibility may be deteriorated. The contrast ratio, as used herein, is measured by the following method.

Specifically, a cool cathode fluorescent tube light source and a diffusion plate disposed therewith as a backlight unit and two polarizers (AMN-3244TP, product of Samsung) are used. The luminance ($L_{max}$), at the front face, of light passed through the polarizers arranged in paralle Nicol is divided by luminance ($L_{min}$), at the front face, of light passed through the crossed Nicols polarizers ($L_{max}/L_{min}$) to determine a contrast, and the contrast ($L_1$) of the antiglare film (light-transmitting substrate+antiglare layer and the like) is divided by the contrast ($L_2$) of the light-transmitting substrate to determine a contrast ratio (($L_1/L_2$)×100(%)).

The luminance is measured with a luminance coloriometer (BM-5A, product of TOPCON CORP.). The measurement angle of the luminance coloriometer is set to 1° and the visual field on a sample is set to φ5 mm. With respect to the quantity of light from the backlight, two polarizers are arranged in parallel nicol without setting a sample so as to provide a luminance of 3600 cd/m² at the front surface.

The contrast ratio in a bright room is preferably similar to the contrast ratio in a dark room.

The antiglare film of the present invention may be produced by forming an antiglare layer on the light-transmitting substrate using a composition for an antiglare layer containing, for example, two or more types of fine particles, binder particles, an ionizing radiation-curable resin, a solvent, and a photopolymerization initiator.

In the formation of the antiglare layer and the composition for an antiglare layer, a method and a material similar to those for the antiglare layer of the antiglare film may be used.

The antiglare film of the present invention may be produced into a polarizer by providing the antiglare film of the present invention on the surface of a polarizing element so that the element is in contact with the surface opposite to the surface including the antiglare layer. Such a polarizer is another aspect of the present invention.

Examples of the polarizing element to be used include, but are not particularly limited to, a polyvinyl alcohol film, a polyvinyl formal film, a polyvinyl acetal film, and a saponified ethylene/vinyl acetate copolymer film, which are prepared by dyeing the films with iodine or the like and stretching the dyed films. In the lamination of the polarizing element and the optical layered body of the present invention, the light-transmitting substrate (preferably triacetyl cellulose film) is preferably subjected to saponification treatment. The saponification treatment can improve adhesion and thereby an anti-static effect is also provided.

Another aspect of the present invention is an image display device including the antiglare film or the polarizer on the outermost surface. The image display device may be an LCD, a PDP, an FED, an ELD (organic EL, inorganic EL), a CRT, a tablet computer, a touch panel, an electronic paper display, or the like.

An LCD, which is a typical example of the image display device, includes a transmission display and light source apparatus illuminating the transmission display from the backside. In cases where the image display device of the present invention is an LCD, the antiglare film of the present invention or the polarizer of the present invention is formed on the surface of the transmission display.

In cases where the image display device of the present invention is a liquid crystal display device including the antiglare film of the present invention, the light from the light source apparatus illuminates the optical layered body from the downside. An STN liquid crystal display device may include a retardation plate disposed between a liquid crystal display element and a polarizer. Such a liquid crystal display device may optionally have an adhesive layer between the respective layers.

A PDP, which is one of the above image display devices, includes a front side glass substrate (an electrode is formed on the surface) and a backside glass substrate (an electrode and a fine groove are formed on the surface and red, green, and blue phosphor layers are formed in the groove) disposed to face the front side glass substrate. Discharge gas is filled between the substrates. In cases where the image display device of the present invention is a PDP, the antiglare film described above is disposed on the surface of the front side glass substrate or a front plate (glass substrate or film substrate) thereof.

The image display device may be an ELD device in which a light emitter (for example, zinc sulfide, diamine materials) that emits light when a voltage is applied is deposited on a glass substrate and an image is displayed by controlling the voltage applied to the substrate; or a CRT in which electric signals are converted into light to generate an image visible to the human eye. In these cases, the antiglare film described above is provided on the outermost surface or on the surface of a front plate of the display device.

Any image display device of the present invention may be used for displays such as televisions, computers, electronic paper displays, touch panels, and tablet computers. Particularly, image display device of the present invention can be suitably used for the surfaces of displays for high-resolution images, such as CRTs, liquid crystal panels, PDPs, ELDs, FEDs, and touch panels.

Advantageous Effects of Invention

The antiglare film of the present invention is a single layer with a small thickness having the above configuration. Therefore, the antiglare film is low in cost and excellent in resistance to crack. Further, occurrence of screen scintillation and white muddiness are sufficiently suppressed while the hard coating properties and antiglare properties are maintained. As a result, the antiglare film can provide a display image with a high contrast even in a dark room. Accordingly, the antiglare film of the present invention can be suitably used for cathode-ray tube (CRT) display devices, liquid crystal displays (LCD), plasma display panels (PDP), electroluminescence displays (ELD), field emission displays (FED), and the like.

BRIEF DESCRIPTION OF DRAWINGS

FIG. 1 is a diagram of the measurement method of θa.

FIG. 2-1 is a STEM picture of a cross-section of the antiglare layer of the antiglare film in accordance with Example 8. The magnification is 3000 times.

FIG. 2-2 is a STEM picture of a cross-section of the antiglare layer of the antiglare film in accordance with Example 8. The magnification is 20000 times.

DESCRIPTION OF EMBODIMENTS

Figure 1:
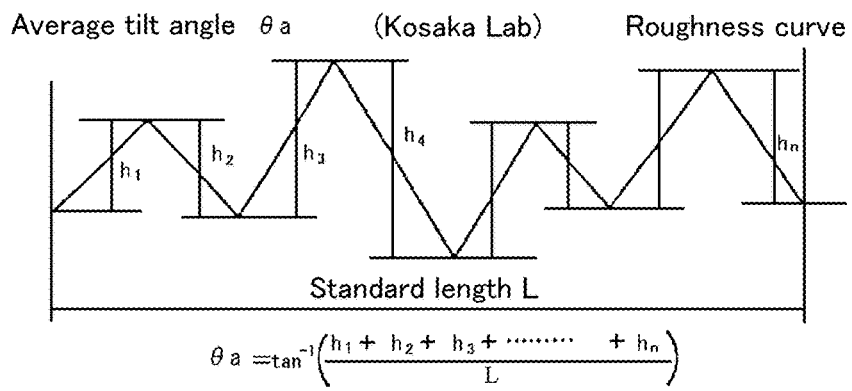

The present invention will be described by means of the following examples which, however, are not intended to limit the scope of the present invention. The terms "part(s)" and "%" are based on mass unless otherwise stated.

Example 1

A light-transmitting substrate (an 80-μm-thick triacetyl cellulose resin film, TD 80UL, product of Fujifilm Corporation) was prepared. A composition for an antiglare layer with the formulation shown below was applied to one side of the light-transmitting substrate to prepare a coating. Then, the formed coating was dried for 60 seconds in a hot oven at 50° C. to evaporate the solvent in the coating. The coating was cured with ultraviolet light until the accumulated light quantity reaches 50 mJ/cm$^2$, and thereby formed into a 4-μm-thick antiglare layer (after cured). Thus, an antiglare film in accordance with Example 1 was prepared.

(Composition for Antiglare Layer)

Organic fine particles (acrylic/styrene copolymer particles, average particle size of 2.0 μm, refractive index of 1.515, product of Sekisui Plastics Co., Ltd.) 1 part by mass Spherical inorganic fine particles (aluminosilicate particles, average particle size of 2.0 μm, refractive index of 1.50, product of MIZUSAWA INDUSTRIAL CHEMICALS, LTD.) 3 parts by mass Fumed silica (AEROSIL R805, average particle size of 12 nm, product of Nippon Aerosil Co., Ltd.) 1 part by mass Pentaerythritoltriacrylate (PETA, product of DAICEL-CYTEC Company LTD.) 60 parts by mass Urethane acrylate (UV1700B, product of The Nippon Synthetic Chemical Industry Co., Ltd.) 40 parts by mass Irgacure 184 (product of BASF Japan Ltd.) 6 parts by mass Irgacure 907 (product of BASF Japan Ltd.) 1 part by mass Polyether-modified silicone (TSF4460, product of Momentive Performance Materials Inc.) 0.025 parts by mass Toluene 105 parts by mass Isopropyl alcohol 30 parts by mass Cyclohexanone 15 parts by mass The fumed silica was surface-treated with a silane coupling agent containing a methyl group.

Example 2

A composition for an antiglare layer was prepared as in Example 1 except that the amount of the organic fine particles was 5 parts by mass. An antiglare film according to Example 2 was produced as in Example 1 except that this composition for an antiglare layer was used.

Example 3

A composition for an antiglare layer was prepared as in Example 1 except that the amount of the organic fine particles was 12 parts by mass. An antiglare film according to Example 3 was produced as in Example 1 except that this composition for an antiglare layer was used.

Example 4

A composition for an antiglare layer was prepared as in Example 1 except that the amount of the organic fine particles was 5 parts by mass and the amount of the inorganic fine particles was 0.3 parts by mass. An antiglare film according to Example 4 was produced as in Example 1 except that this composition for an antiglare layer was used.

Example 5

A composition for an antiglare layer was prepared as in Example 1 except that the amount of the organic fine particles was 5 parts by mass and the amount of the inorganic fine particles was 8 parts by mass. An antiglare film according to Example 5 was produced as in Example 1 except that this composition for an antiglare layer was used.

Example 6

A composition for an antiglare layer was prepared as in Example 1 except that the amount of the organic fine particles was 5 parts by mass and the amount of the fumed silica was 0.3 parts by mass. An antiglare film according to Example 6 was produced as in Example 1 except that this composition for an antiglare layer was used.

Example 7

A composition for an antiglare layer was prepared as in Example 1 except that the amount of the organic fine particles was 5 parts by mass and the amount of the fumed silica was 4 parts by mass. An antiglare film according to Example 7 was produced as in Example 1 except that this composition for an antiglare layer was used.

Example 8

A composition for an antiglare layer was prepared as in Example 1 except that the amount of the organic fine particles was 5 parts by mass and 1 part by mass of fumed silica (average particle size of 12 nm, product of Nippon Aerosil Co., Ltd., surface-treated with a silane coupling agent containing octylsilane) was used. An antiglare film according to Example 8 was produced as in Example 1 except that this composition for an antiglare layer was used.

Example 9

A composition for an antiglare layer was prepared as in Example 1 except that the amount of the organic fine particles was 5 parts by mass and no fumed silica was blended. An antiglare film according to Example 9 was produced as in Example 1 except that this composition for an antiglare layer was used.

Comparative Example 1

A composition for an antiglare layer was prepared as in Example 1 except that the amount of the organic fine particles was 5 parts by mass and no inorganic fine particles were blended. An antiglare film according to Comparative Example 1 was produced as in Example 1 except that this composition for an antiglare layer was used Comparative Example 2

A composition for an antiglare layer was prepared as in Example 1 except that no organic fine particles were blended. An antiglare film according to Comparative Example 2 was produced as in Example 1 except that this composition for an antiglare layer was used.

Comparative Example 3

A composition for an antiglare layer was prepared as in Example 1 except that the amount of the organic fine particles was 10 parts by mass and no inorganic fine particles and no fumed silica were blended. An antiglare film according to Comparative Example 3 was produced as in Example 1 except that this composition for an antiglare layer was used.

Comparative Example 4

A composition for an antiglare layer was prepared as in Example 1 except that no organic fine particles were blended and 3 parts by mass of silica (average particle size of 2.0 μm, product of Tosoh Silica Corporation) was blended as the inorganic fine particles. An antiglare film according to Comparative Example 4 was produced as in Example 1 except that this composition for an antiglare layer was used.

Comparative Example 5

A composition for an antiglare layer was prepared as in Example 1 except that surface-untreated, i.e., hydrophilic AEROSIL 130 (product of Nippon Aerosil Co., Ltd., a pH of 4.0 to 4.5, a specific surface area of 130 m2/g) with an average particle size of 16 nm was used instead of the fumed silica. However, gelation and precipitation of the composition for an antiglare layer were caused at an early stage, which results in failure of the formation of an antiglare layer.

Reference Example 1

A composition for an antiglare layer was prepared as in Example 1 except that the amount of the organic fine particles was 5 parts by mass and 3 parts by mass of amorphous aluminosilicate (average particle size of 2.0 μm, product of MIZUSAWA INDUSTRIAL CHEMICALS, LTD.) was used as the inorganic fine particles. An antiglare film according to Reference Example 1 was produced as in Example 1 except that this composition for an antiglare layer was used.

Reference Example 2

A composition for an antiglare layer was prepared as in Example 1 except that the amount of the organic fine particles was 18 parts by mass. An antiglare film according to Reference Example 2 was produced as in Example 1 except that this composition for an antiglare layer was used.

Reference Example 3

A composition for an antiglare layer was prepared as in Example 1 except that the amount of the organic fine particles was 5 parts by mass and the amount of the inorganic fine particles was 12 parts by mass. An antiglare film according to Reference Example 3 was produced as in Example 1 except that this composition for an antiglare layer was used.

Reference Example 4

A composition for an antiglare layer was prepared as in Example 1 except that acrylic/styrene copolymer particles (average particle size of 1.0 μm, refractive index of 1.515, product of Sekisui Plastics Co., Ltd.) was used as the organic fine particles in an amount of 10 parts by mass and amorphous aluminosilicate particles (average particle size of 0.5 μm, refractive index of 1.50, product of MIZUSAWA INDUSTRIAL CHEMICALS, LTD.) was used as the inorganic fine particles in an amount of 7 parts by mass. An antiglare film according to Reference Example 4 was produced as in Example 1 except that this composition for an antiglare layer was used and the thickness thereof after cured was set to 1.5 μm.

Reference Example 5

A composition for an antiglare layer was prepared as in Example 1 except that acrylic/styrene copolymer particles (average particle size of 10.0 μm, refractive index of 1.515, product of Sekisui Plastics Co., Ltd.) was used as the organic fine particles in an amount of 5 parts by mass, amorphous aluminosilicate particles (average particle size of 5 μm, refractive index of 1.50, product of MIZUSAWA INDUSTRIAL CHEMICALS, LTD.) was used as the inorganic fine particles in an amount of 3 parts by mass, and the amount of the fumed silica was 2 parts by mass. An antiglare film according to Reference Example 5 was produced as in Example 1 except that this composition for an antiglare layer was used and the thickness thereof after cured was set to 15.0 μm.

The antiglare films in accordance with Examples 1 to 9, Comparative Examples 1 to 5, and Reference Examples 1 to 5 were evaluated based on the following items. Table 1 shows the evaluation results.
(Coating Liquid Stability)

After an antiglare film was prepared, coating liquid stability was evaluated as "Good" in cases where no precipitate was present in a coating liquid tank; coating liquid stability was evaluated as "Acceptable" in cases where no foreign matter was present in an antiglare layer, but a precipitate was present in a tank; and coating liquid stability was evaluated as "Poor" in cases where a foreign matter was present in an antiglare layer and a precipitate was present in a tank.
(Antiglare Properties)

The antiglare properties of the resulting antiglare film were evaluated based on the following criteria by visual observation of a specimen prepared by stacking a black acrylic plate and an evaluation film with a transparent adhesive agent disposed therebetween (the adhesive faces the uncoated face) in a bright room.
Good: No reflection of surroundings was observed.
Poor: Reflection of surroundings was distinctly observed.
(Evaluation of Gloss Blackness in a Bright Room: Whether the Appearance is Glossy Black without White Muddiness)

The white muddiness of the resulting antiglare film was evaluated based on the following criteria by visual observation of a specimen prepared by stacking a black acrylic plate and an evaluation film with a transparent adhesive agent disposed therebetween (the adhesive faces the uncoated face) in a bright room.
Excellent: The surface had no white muddiness, and gloss blackness in a bright room was very good.
Good: The surface had no white muddiness, and gloss blackness in a bright room is good.
Poor: The surface totally had white muddiness.
(Screen Scintillation Evaluation)

The antiglare properties of the resulting antiglare film were evaluated based on the following criteria by visual observation of a laminate of a light box, a black matrix glass with 140 ppi disposed on the box, and an evaluation film disposed on the glass.
Excellent: Screen scintillation was hardly observed.
Good: Screen scintillation was sufficiently suppressed.
Poor: No preventive effect of screen scintillation was observed.

(Evaluation of Gloss Blackness in a Dark Room: Contrast Ratio in a Dark Room)

In a dark room, a cool cathode fluorescent tube light source and a diffusion plate disposed therewith as a backlight unit and two polarizers (AMN-3244TP, product of Samsung) were used. The luminance ($L_{max}$), at the front face, of light passed through the polarizers arranged in parallel Nicol was divided by the luminance ($L_{min}$), at the front face, of light passed through the crossed Nicols polarizers to determine the contrast ($L_1$) of an antiglare film (light-transmitting substrate+antiglare layer) and the contrast ($L_2$) of a light-transmitting substrate. A contrast ratio was calculated by ($L_1/L_2$)×100(%).

The luminance was measured with a luminance colorimeter (BM-5A, product of TOPCON CORP.). The measurement angle of the luminance colorimeter was set to 1° and the visual field on a sample was set to ϕ5 mm. With respect to the quantity of light from the backlight, two polarizers were arranged in parallel nicol without setting a sample so as to provide luminance of 3600 cd/m².

An antiglare film with a contrast ratio exceeding 90 was evaluated as a film "having high contrast and excellent gloss blackness in a dark room". An antiglare film with a contrast ratio exceeding 80 and 90 or less was evaluated as a film "having high contrast and good gloss blackness in a dark room". An antiglare film with a contrast ratio of 80 or less was evaluated as a film "having low contrast and no gloss blackness in a dark room".
(Pencil Hardness)

The moisture content of the resulting antiglare film was controlled for 2 hours at a temperature of 25° C. and relative humidity of 60%. The antiglare film was subjected to a pencil hardness test (500 g of load) prescribed in JIS K5600-5-4 (1999) using a test pencil specified in JIS-S-6006. The highest hardness providing no scratch was determined.
(Crack)

In accordance with a mandrel test (a test in which a sample is wound around a metal cylinder) described in DIS-K 5600-5-1, the resulting antiglare film was wound around a ϕ8-mm mandrel bar in the longitudinal direction with the antiglare layer facing outward, and the generation of a crack was evaluated.

A film uncracked was evaluated as "Good". A film cracked was evaluated as "Poor".
(Average Distance (Sm) Between a Projection and a Depression; Arithmetic Mean Roughness (Ra) of an Projections and Depressions; Average Tilt Angle (θa) of Projections and Depressions; and 10-Point Mean Roughness (Rz))

With respect to an antiglare film with a surface roughness, the average distance (Sm) between a projection and a depression; arithmetic mean roughness (Ra) of projections and depressions; and 10-point mean roughness (Rz) were measured according to JIS B 0601-1994, and an average tilt angle (θa) of projections and depressions was measured by the method shown in FIG. 1. These Sm, Ra, θa, and Rz were measured with a surface roughness measurement device: SE-3400/product of Kosaka Laboratory Ltd. in the following conditions.
(1) Probe of surface roughness detection part:
Model/SE2555N (2μ probe), product of Kosaka Laboratory Ltd.
(tip curvature radius 2 μm/apex: 90 degrees/material: diamond)

(2) Measurement conditions of surface roughness measurement device:
Standard length (cut-off value of roughness curve λc: 2.5 mm
Evaluation length (standard length (cut-off value λc)×5): 12.5 mm
Probe sending speed: 0.5 mm/s The cut-off value is usually set at 0.8 mm, but in the present invention, the cut-off value is set at 2.5 mm for the measurement. The reason for this as follows: the surface roughness on the antiglare film of the present invention preferably has a shape that enables to prevent reflection of natural light and provide a black display of an image display device excellent in gloss blackness (reproducibility of luster black color as if wetted in screen display) as described above. That is, a large and gentle surface roughness is preferable, and in order to measure this surface roughness, the cut-off value is preferably set at 2.5 mm for the measurement.

(Aggregation State of Fine Particles)

The cross-section of the antiglare film was observed with STEM at a magnification of 2000 times to 30000 times. An aggregate formed of organic fine particles and inorganic fine particles was evaluated as "Good". Anything other than that was evaluated as "Poor".

TABLE 1

|  | Film thickness | Unevenness of surface | | | | Gloss blackness in dark room: contrast in dark room | Anti-glare properties | Gloss blackness in bright room: white muddiness |
|  |  | Sm | Ra | θa | Rz |  |  |  |
| --- | --- | --- | --- | --- | --- | --- | --- | --- |
| Example 1 | 4.0 | 355.5 | 0.0788 | 0.155 | 0.422 | 99 | Good | Excellent |
| Example 2 | 4.0 | 250.0 | 0.0970 | 0.210 | 0.539 | 98 | Good | Excellent |
| Example 3 | 4.0 | 215.5 | 0.1432 | 0.346 | 0.818 | 95 | Good | Good |
| Example 4 | 4.0 | 260.6 | 0.0950 | 0.198 | 0.505 | 99 | Good | Excellent |
| Example 5 | 4.0 | 202.1 | 0.1410 | 0.401 | 0.853 | 95 | Good | Good |
| Example 6 | 4.0 | 305.6 | 0.0855 | 0.177 | 0.488 | 96 | Good | Excellent |
| Example 7 | 4.0 | 203.3 | 0.1488 | 0.388 | 0.899 | 96 | Good | Good |
| Example 8 | 4.0 | 240.2 | 0.1122 | 0.274 | 0.669 | 96 | Good | Excellent |
| Example 9 | 4.0 | 390.3 | 0.0692 | 0.105 | 0.353 | 97 | Good | Excellent |
| Comparative Example 1 | 4.0 | 505.5 | 0.0602 | 0.068 | 0.321 | 99 | Poor | Excellent |
| Comparative Example 2 | 4.0 | 540.2 | 0.0577 | 0.061 | 0.306 | 99 | Poor | Excellent |
| Comparative Example 3 | 4.0 | 105.6 | 0.3512 | 1.541 | 1.532 | 80 | Good | Poor |
| Comparative Example 4 | 4.0 | 160.4 | 0.2740 | 1.254 | 1.286 | 81 | Good | Poor |
| Comparative Example 5 | — | — | — | — | — | — | — | — |
| Reference Example 1 | 4.0 | 237.8 | 0.1049 | 0.246 | 0.588 | 78 | Good | Good |
| Reference Example 2 | 4.0 | 136.4 | 0.3111 | 1.326 | 1.402 | 88 | Good | Poor |
| Reference Example 3 | 4.0 | 162.1 | 0.2896 | 1.265 | 1.278 | 90 | Good | Poor |
| Reference Example 4 | 1.5 | 220.4 | 0.1377 | 0.354 | 0.788 | 97 | Good | Good |
| Reference Example 5 | 15.0 | 382.1 | 0.0745 | 0.189 | 0.466 | 93 | Good | Good |

|  | Surface Scintillation | Pencil hardness | Crack | Aggregation state of particles | Coating liquid stability |
| --- | --- | --- | --- | --- | --- |
| Example 1 | Excellent | 2H | Good | Good | Good |
| Example 2 | Good | 2H | Good | Good | Good |
| Example 3 | Good | 2H | Good | Good | Good |
| Example 4 | Good | 2H | Good | Good | Good |
| Example 5 | Good | 2H | Good | Good | Good |
| Example 6 | Excellent | 2H | Good | Good | Good |
| Example 7 | Good | 2H | Good | Good | Good |
| Example 8 | Good | 2H | Good | Good | Good |
| Example 9 | Excellent | 2H | Good | Good | Acceptable |
| Comparative Example 1 | Excellent | 2H | Good | Poor | Good |
| Comparative Example 2 | Excellent | 2H | Good | Poor | Good |
| Comparative Example 3 | Good | 2H | Good | Poor | Acceptable |
| Comparative Example 4 | Poor | 2H | Good | Poor | Good |
| Comparative Example 5 | — | — | — | — | Poor |
| Reference Example 1 | Good | 2H | Good | Poor | Good |
| Reference Example 2 | Poor | 2H | Good | Poor | Good |

TABLE 1-continued

| | | | | | |
|---|---|---|---|---|---|
| Example 2 | | | | | |
| Reference Example 3 | Poor | 2H | Good | Poor | Good |
| Reference Example 4 | Good | H | Good | Good | Good |
| Reference Example 5 | Good | 3H | Poor | Good | Good |

Figures 1, 2:
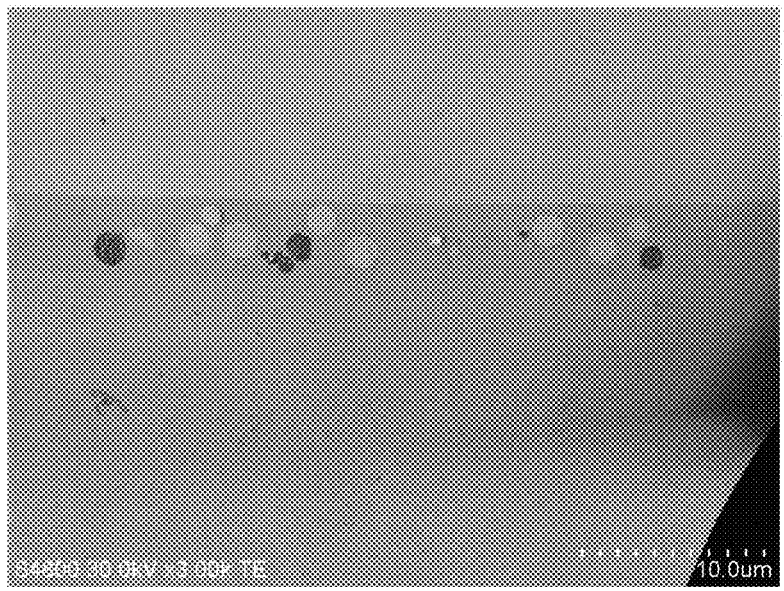
Figure 2:
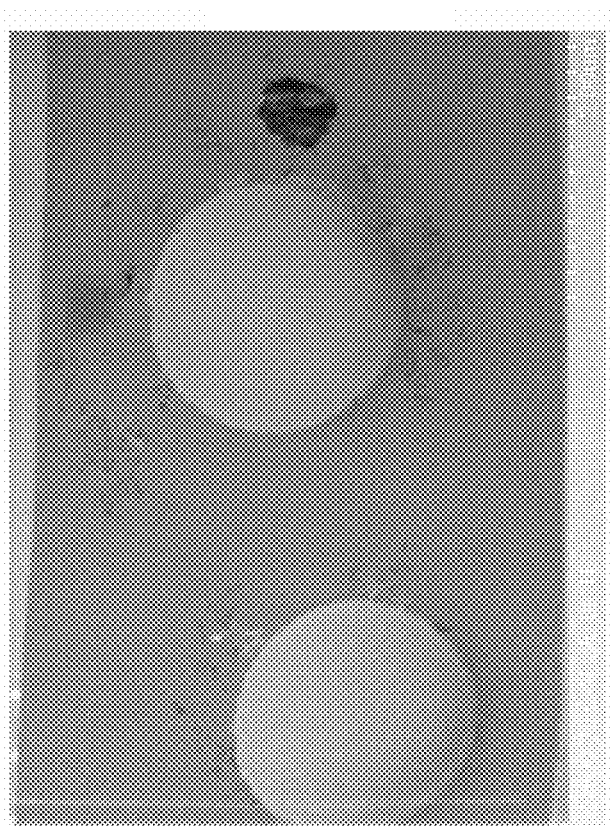
Figure 3:
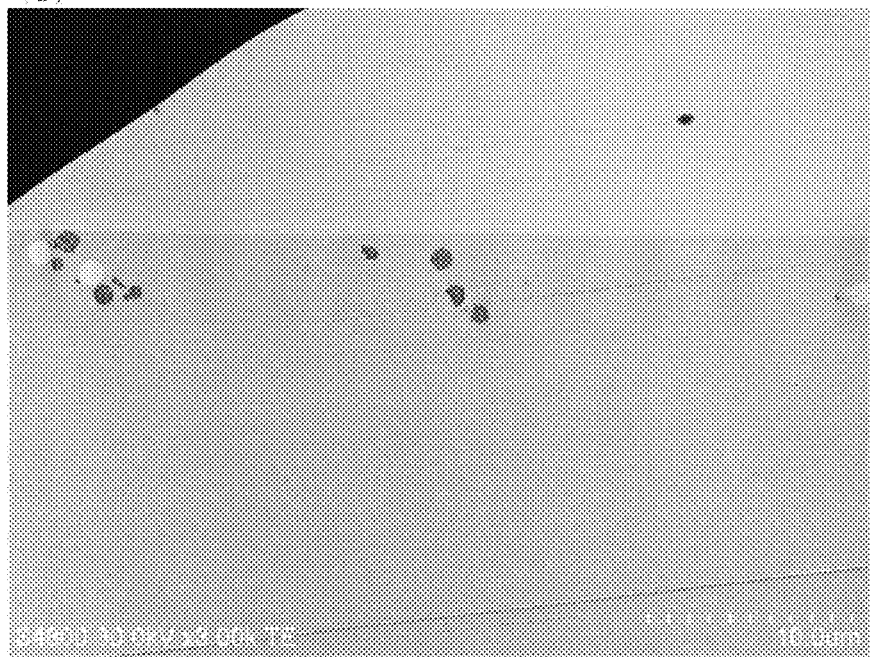
FIG. 3 shows STEM pictures of a cross-section of the antiglare layer of the antiglare film in accordance with Example 9. The magnification of the picture (a) is 3000 times. The magnification of the picture (b) is 10000 times.
Figure 3:
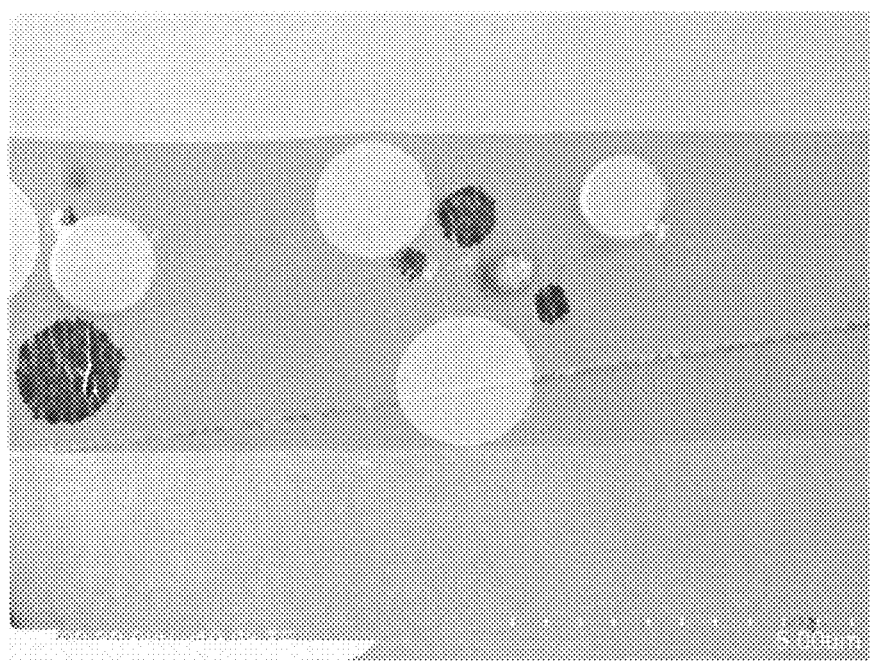

Table 1 shows that all the antiglare films in accordance with the examples have a high contrast ratio in a dark room, and have excellent antiglare properties, properties of preventing white muddiness, properties of preventing screen scintillation, and hard coating properties (pencil hardness and crack). FIGS. 2-1 and 2-2 are STEM pictures of a cross-section of the antiglare layer of the antiglare film in accordance with Example 8. The magnification of FIG. 2-1 is 3000 times. The magnification of FIG. 2-2 is 20000 times. In FIG. 2-1, two aggregates each composed of organic fine particles and inorganic fine particles are observed. FIG. 3 shows two STEM pictures of a cross-section of the antiglare layer of the antiglare film in accordance with Example 9. The magnification of the picture (a) is 3000 times. The magnification of the picture (b) is 10000 times. In FIG. 3(b), two aggregates each composed of organic fine particles and inorganic fine particles are observed. As shown in FIGS. 2-1, 2-2, and 3, in the antiglare films according to Examples 8 and 9, an aggregate is formed of organic fine particles and inorganic fine particles in the antiglare layer, and particularly in Example 8, fumed silica is unevenly distributed around the organic fine particles and inorganic fine particles. The results of Example 9 show that the coating liquid stability when fumed silica is used is more excellent than that when no fumed silica is used.

The antiglare films according to the examples in which properties of preventing white muddiness is evaluated as "Excellent" have surface haze values in the range of 0.1% or more and less than 2% and haze values owing to internal diffusion in the range of 2% or more and less than 5%.

Figure 4:
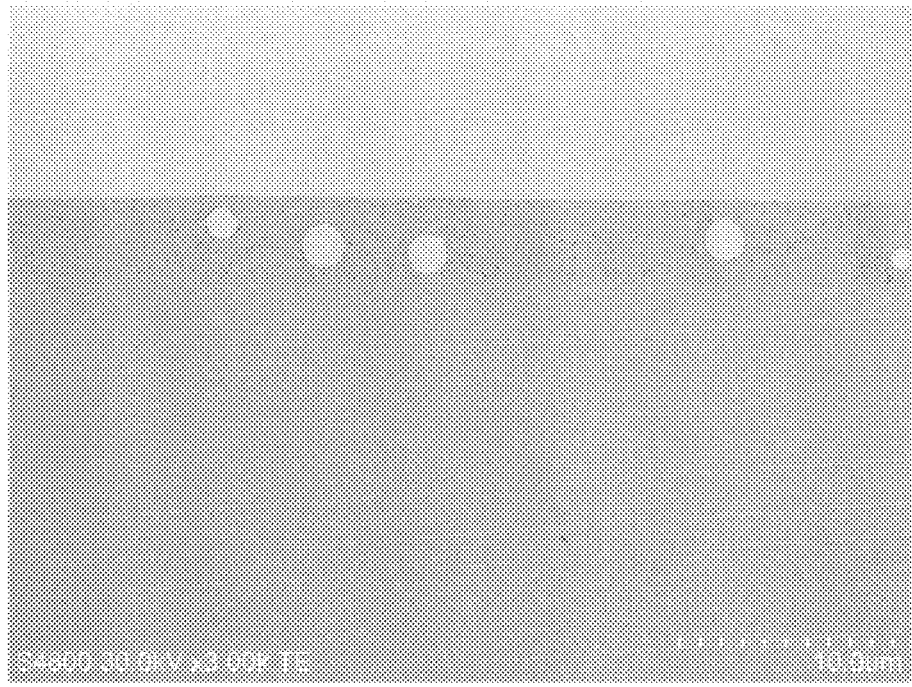
FIG. 4 shows STEM pictures of a cross-section of the antiglare layer of the antiglare film in accordance with Comparative Example 1. The magnification of the picture (a) is 3000 times. The magnification of the picture (b) is 20000 times.
Figure 4:
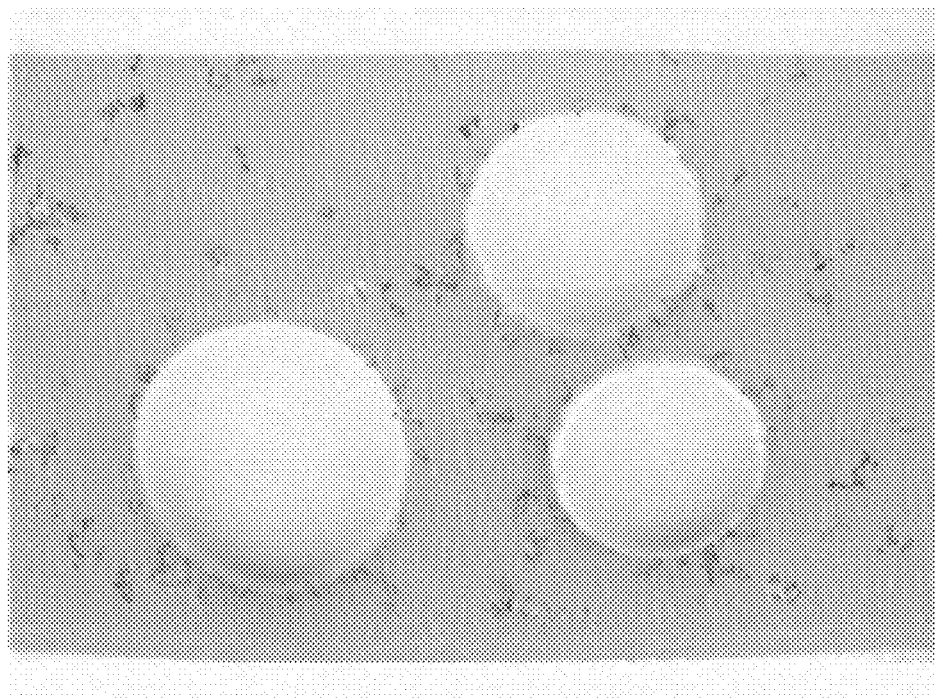
Figure 5:
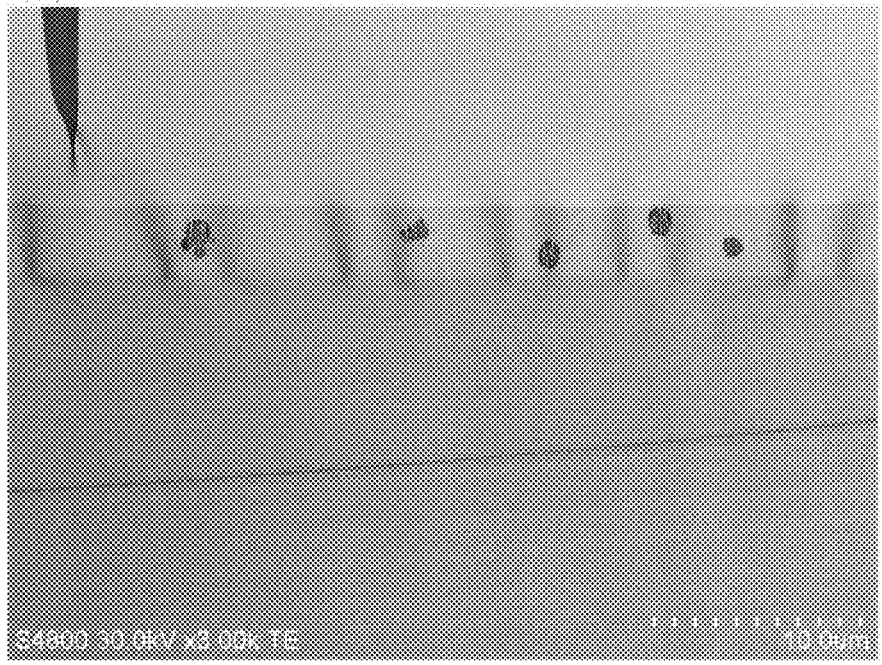
FIG. 5 shows STEM pictures of a cross-section of the antiglare layer of the antiglare film in accordance with Comparative Example 2. The magnification of the picture (a) is 3000 times. The magnification of the picture (b) is 20000 times.
Figure 5:
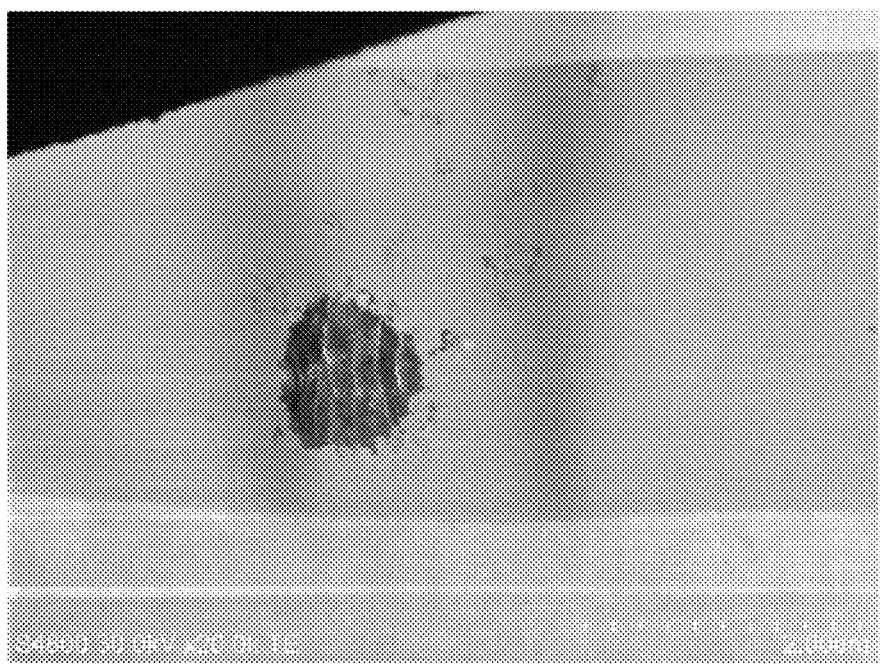

On the other hand, both the antiglare films according to Comparative Examples 1 and 2 have less antiglare properties. FIG. 4 shows two STEM pictures of a cross-section of the antiglare layer of the antiglare film in accordance with Comparative Example 1. FIG. 5 shows two STEM pictures of a cross-section of the antiglare layer of the antiglare film in accordance with Comparative Example 2. In both FIGS. 4 and 5, the magnification of the picture (a) is 3000 times and the magnification of the picture (b) is 20000 times. As shown in FIGS. 4 and 5, no aggregates are formed in the antiglare layer of the antiglare films in accordance with Comparative Examples 1 and 2. Further, fumed silica is rather dispersed throughout the antiglare layer than unevenly distributed around the particles.

The antiglare film according to Comparative Example 3 in which the antiglare layer contains no inorganic fine particles is poor in properties of preventing white muddiness. The antiglare film according to Comparative Example 4 in which the antiglare layer contains no organic fine particles is poor in properties of preventing white muddiness and properties of preventing screen scintillation.

The antiglare film according to Reference Example 1 shows less contrast in a dark room because the inorganic fine particles are amorphous aluminosilicate. The antiglare film according to Reference Example 2 is poor in properties of preventing white muddiness and properties of preventing screen scintillation because of too large an amount of organic fine particles. The antiglare film according to Reference Example 3 is poor in properties of preventing white muddiness and properties of preventing screen scintillation because of too large an amount of inorganic fine particles. The antiglare film according to Reference Example 4 shows poor results of the pencil hardness test because of the small thickness of the antiglare layer. The antiglare film according to Reference Example 5 is poor in resistance to crack because of the large thickness of an antiglare layer.

A composition for a low refractive index layer with the following formulation was applied to the surface of the antiglare layer of each of the antiglare films obtained in the examples so as to be a film with a thickness of 0.1 μm after drying (40° C.×1 minute). The film was cured by ultraviolet radiation with a radiation dose of 100 $mJ/cm^2$ using ultraviolet radiation apparatus (light source H bulb, product of Fusion UV Systems Japan KK.). Thus, a low refractive index layer was produced. An antiglare film having the resulting low refractive index layer was excellent in white muddiness prevention effects.

(Composition for Low Refractive Index Layer)

Hollow silica fine particles (solid content of the silica fine particles: 20% by mass, solution: methyl isobutyl ketone, average particle size: 50 nm) 40 parts by mass Pentaerythritol triacrylate (PETA) (product of DAICEL-CYTEC Company LTD.) 10 parts by mass Polymerization initiator (Irgacure 127: product of BASF Japan Ltd.) 0.35 parts by mass Modified silicone oil (X22164E: product of Shin-Etsu Chemical Co., Ltd.) 0.5 parts by mass MIBK 320 parts by mass PGMEA 161 parts by mass

INDUSTRIAL APPLICABILITY

The antiglare film of the present invention can be suitable for cathode-ray tube (CRT) display devices, liquid crystal displays (LCD), plasma display panels (PDP), electroluminescence displays (ELD), field-emission displays (FED), touch panels, electronic paper displays, tablet computers, and the like.

The invention claimed is:
1. An antiglare film comprising:
a light-transmitting substrate; and
an antiglare layer having a surface roughness on at least one surface of the light-transmitting substrate,
wherein the antiglare layer contains an aggregate composed of two or more types of spherical fine particles in a binder resin,
the aggregate forms a projection of the surface of the antiglare layer to form a surface roughness on the antiglare layer,
the two or more types of spherical fine particles do not protrude from the surface of the binder resin, the two or more types of spherical fine particles include one or more types of organic fine particles and one or more types of inorganic fine particles, the organic fine particles have an average particle size of 0.3 to 10.0 μm and the inorganic fine particles have an average particle size of 500 nm to 5.0 μm, and the antiglare layer further contains binder particles that promote the formation of an aggregate composed of the organic fine particles and the inorganic fine particles and have a particle size of 200 nm or smaller.

2. The antiglare film according to claim 1, wherein the binder particles are unevenly distributed around the organic fine particles and the inorganic fine particles.

3. The antiglare film according to claim 1, wherein the binder particles are fumed silica.

4. The antiglare film according to claim 3, wherein the fumed silica is surface-treated.

5. The antiglare film according to claim 4, wherein the fumed silica is surface-treated by hydrophobing treatment, and the hydrophobizing treatment is methyl treatment, octylsilane treatment, or dimethyl silicone oil treatment.

6. The antiglare film according to claim 1, wherein the organic fine particles are fine particles of at least one material selected from the group consisting of acrylic resins, polystyrene resins, styrene/acrylic copolymers, polyethylene resins, epoxy resins, silicone resins, polyvinylidene fluoride resins, and polyfluoroethylene resins.

7. The antiglare film according to claim 1, wherein the inorganic fine particles are at least one type of fine particles selected from the group consisting of particles of aluminosilicate, talc, mica, and silica.

8. A polarizer comprising a polarizing element, wherein the polarizer comprises the antiglare film according to claim 1, on a polarizing element surface.

9. An image display device comprising the antiglare film according to claim 1, or a polarizer comprising a polarizing element, wherein the polarizer comprises the antiglare film according to claim 1 on a polarizing element surface, on an outermost surface thereof.

10. The antiglare film according to claim 1, wherein the organic particles are present in an amount of 0.5 to 15% by mass.

11. The antiglare film according to claim 1, wherein the organic particles are present in an amount of 2 to 10% by mass.

12. The antiglare film according to claim 1, wherein the inorganic particles are present in an amount of 0.1 to 10% by mass.

13. The antiglare film according to claim 1, wherein the inorganic particles are present in an amount of 0.5 to 7% by mass.

14. The antiglare film according to claim 1, wherein the inorganic particles are configured to be placed among and below the organic fine particles in the aggregate.

15. The antiglare film according to claim 1, which has a haze value of less than 20%.

* * * * *